United States Patent [19]
Houghton

[11] Patent Number: 5,875,246
[45] Date of Patent: Feb. 23, 1999

[54] DISTRIBUTED AUDIO SIGNAL PROCESSING IN A NETWORK EXPERIENCING TRANSMISSION DELAY

[75] Inventor: Philip J. Houghton, Surrey, Canada

[73] Assignee: Xinex Networks Inc., New Westminster, Canada

[21] Appl. No.: 739,294

[22] Filed: Oct. 29, 1996

[51] Int. Cl.⁶ .............................. H04M 1/00; H04B 3/20
[52] U.S. Cl. ..................... 379/406; 370/288; 370/289; 379/410
[58] Field of Search ...................... 379/406, 410, 379/411, 409; 370/286, 289, 292, 288, 287

[56] References Cited

U.S. PATENT DOCUMENTS

| | | |
|---|---|---|
| 4,670,903 | 6/1987 | Araseki et al. .......................... 379/411 |
| 5,018,134 | 5/1991 | Kokubo et al. ......................... 370/32.1 |
| 5,283,784 | 2/1994 | Genter ..................................... 370/32.1 |
| 5,307,405 | 4/1994 | Sih ............................................. 379/410 |
| 5,353,348 | 10/1994 | Sendyk et al. ........................... 379/410 |
| 5,563,944 | 10/1996 | Hasegawa ................................ 379/410 |
| 5,631,900 | 5/1997 | McCaslin et al. ...................... 370/287 |
| 5,668,794 | 9/1997 | McCaslin et al. ...................... 370/288 |
| 5,684,792 | 11/1997 | Ishihara ................................... 370/286 |

*Primary Examiner*—Daniel S. Hunter
*Assistant Examiner*—Charles N. Appiah
*Attorney, Agent, or Firm*—Pillsbury Madison & Sutro LLP

[57] ABSTRACT

Apparatus and method for the prevention of echo signals in terminals connected to a network carrying telephony traffic. The echo prevention occurs prior to the introduction of signal delay by a network. The method and apparatus function to control echo contained in audio signals transmitted between the nodes of a network, wherein the audio signals experience delay in transit from node to node and wherein the echo controlling method is distributed across the nodes.

4 Claims, 12 Drawing Sheets

DISTRIBUTED AUDIO SIGNAL PROCESSING IN A NETWORK EXPERIENCING TRANSMISSION DELAY

FIELD OF THE INVENTION

This invention relates to apparatus and methods for performing signal processing of audio signals transmitted over a network wherein said network introduces variable amounts of transmission delay, and wherein said signal processing controls the effects of signal reflection.

BACKGROUND TO THE INVENTION

In a telephone network which employs analog transmission over 2-wire circuits, echo is introduced at the point of conversion between 4-wire and 2-wire circuits—typically referred to as the "hybrid". This echo results from an imperfect impedance match between the 4-wire and 2-wire circuits. Proper control of impedance matching, however, limits the echo to an allowable level.

The subjective effect of this echo is quite acceptable. Indeed, a controlled amount of near-end echo, known as sidetone, is desirable to prevent a telephone from sounding "dead". When transmission delay is introduced into the voice path, however, the effects of echo become much more objectionable and may ultimately render a circuit unusable. This situation can occur in the public network if multiple transatlantic hops utilizing geo-stationary satellites are connected in tandem. In order to mitigate this effect, long distance circuits in the public network are often equipped with echo suppressers which attenuate the strength of unwanted echo signals.

Local telephone networks and customer premise equipment are not equipped with echo suppressers, since local connections made by conventional space/time division switching means can never encounter the long transmission delays that would produce unacceptable echoes.

However, it is becoming more common to provide voice services over packet switched networks using technologies such as Asynchronous Transfer Mode, Ethernet, isoEthernet and TCP/IP. Control over transmission delay is less secure under packet switched technologies than with space/time division switching and in some cases may not be provided at all. This migration from space/time division switching to packet switching creates a requirement for echo suppression to be provided in local switching and transmission equipment.

There exists another situation in which echo can be introduced to a local telephone network. This occurs when speakerphones are utilized. Sounds originating from a far-end talker are broadcast into the room occupied by the speakerphone user. Some of this sound is reflected off objects in the room and the walls of the room itself, and picked up by the microphone attached to the speakerphone. This reflected sound is transmitted back to the far-end talker and experienced as echo. This situation occurs even when 4-wire circuits are used throughout the connection.

There is, therefore, a need for a method and apparatus for controlling echo at its point of introduction to a local telephone network, in a practical and cost-effective manner.

SUMMARY OF THE INVENTION

The present invention describes an implementation of an echo controller to remove the echo before it is delayed and becomes objectionable. The invention permits echo control mechanisms to be distributed across the nodes of a network and does not require expensive common equipment to be provided.

It is an object of the present invention to provide apparatus and method for the prevention of echo signals in terminals connected to a network carrying telephony traffic.

It is a further object of the present invention to provide apparatus and method wherein the echo prevention occurs prior to the introduction of signal delay by a network.

It is a further object of the present invention to provide apparatus and method wherein the echo prevention may be performed in a cost effective manner such that every node connected to the network may be so equipped.

Accordingly, in one broad aspect, the invention provides a method of controlling echo contained in audio signals transmitted between the nodes of a network, wherein the audio signals experience delay in transit from node to node and wherein the echo controlling method is distributed across the nodes, said method comprising:
(a) feeding a signal from a local source of audio information to the node;
(b) canceling echo present in the local source signal to produce an echo canceled signal;
(c) suppressing residual echo present in the echo canceled signal to produce an echo suppressed signal; and
(d) delivering the echo suppressed signal to the network.

Preferably, the echo cancellation of step (b) comprises:
(e) feeding a signal from a network source of audio information to the node;
(f) filtering the network source signal to provide an estimated echo signal; and
(g) subtracting the estimated echo signal from the local source signal of step (a) to produce the echo canceled signal of step (b).

The filtering of step (f), preferably, comprises
(h) feeding a network source signal to the filter node;
(i) storing samples of the network source signal in a storage device at regular time intervals to provide a set of delayed samples;
(j) multiplying the value of each delayed sample by a filter coefficient appropriate to the relative delay of each sample to provide a weighted sample; and
(k) adding together the value of each weighted sample to provide the estimated echo signal of step (f).

The method as hereinbefore defined may further comprise
(l) measuring the power contained in the local source signal of step (a) to provide a local power signal;
(m) measuring the power contained in the network source signal of step (e) to provide a network power signal; and
(n) comparing the relative strengths of the local power signal and the network power signal to provide an activity status signal.

The method of the invention as hereinabove defined preferably further comprises
(o) feeding the activity status signal of step (n) to a filter coefficient adjustment function;
(p) feeding the echo canceled signal of step (b) to the filter coefficient adjustment function;
(q) feeding the network power signal of step (m) to the filter coefficient adjustment function;
(r) feeding the set of delayed samples of step (i) to a Finite Impulse Response (FIR) filter function; and
(s) modifying the coefficients of the FIR filter function to provide an updated set of filter coefficients.

The method may yet further comprise
(t) measuring the power contained in the echo canceled signal of step (b) to provide a residual echo power signal;
(u) measuring the power contained in the local source signal of step (a) to provide a local power signal; and
(v) comparing the relative strengths of the residual echo power signal and the local power signal to produce an echo return loss enhancement signal.

Preferably the echo suppression of step (c) comprises:
(w) measuring the power contained in the local source signal of step (a) to provide a local power signal;
(x) measuring the power contained in the network source signal of step (e) to provide a network power signal;
(y) comparing the relative strengths of the local power signal and the network power signal to provide an activity status signal;
(z) feeding the activity status signal to a variable attenuation function;
(aa) feeding the echo return loss enhancement signal derived in step (v) to the variable attenuation function;
(ab) feeding the echo canceled signal of step (b) to the variable attenuation function;
(ac) modifying the gain of the variable attenuation function according to the relative level of the echo return loss enhancement signal and the condition of the activity status signal to provide a switched gain control; and
(ad) multiplying the echo canceled signal by the switched gain control to produce the echo suppressed signal.

The gain modification of step (ac), preferably, comprises:
(ae) changing the state of an attenuation state machine according to the current value of the activity status signal and the current state of the attenuation state machine;
(af) setting the value of a switch position control according to the current state of the attenuation state machine; and
(ag) modifying the value of the switched gain control according to the value of the switch position control and the value of the echo return loss enhancement signal.

Thus, it is one aspect of the invention that echo control is performed not in the network itself, but in every node connected to the network. The invention further utilizes both signal cancellation and signal attenuation techniques, in whole or in part, in a manner which enables a smooth transition between each operating mode. The echo control is performed at a point close in both space and time to the source of the echo. In particular, the echo control is performed before the echo signal experiences time delay in transmission across a network. The echo control is compatible with the operation of a speakerphone and the operation of an analog interface to the Public Switched Telephone Network. In one embodiment of the invention, the echo control is provided by digital signal processing means.

The invention further provides signal processing apparatus comprising means for effecting the functions and steps of the methods as hereinabove defined.

Accordingly, in a further broad aspect, the invention provides a signal processing apparatus for controlling echo contained in audio signals transmitted between the nodes of a network wherein the audio signals experience delay in transit from node to node and wherein the echo controlling method is distributed across the nodes, said apparatus comprising:
(a) circuitry constructed and adapted to feed a signal from a local source of audio information to a node;
(b) circuitry constructed and adapted to cancel echo present in the local source signal to produce an echo canceled signal;
(c) circuitry constructed and adapted to suppress any residual echo present in the echo canceled signal to produce an echo suppressed signal; and
(d) circuitry constructed and adapted to deliver the echo suppressed signal to the network

BRIEF DESCRIPTION OF THE DRAWINGS

In order that the invention may be better understood, preferred embodiments will now be described by way of example only, with reference to the accompanying drawings wherein.

DETAILED DESCRIPTION OF PREFERRED EMBODIMENTS

Figure 1:
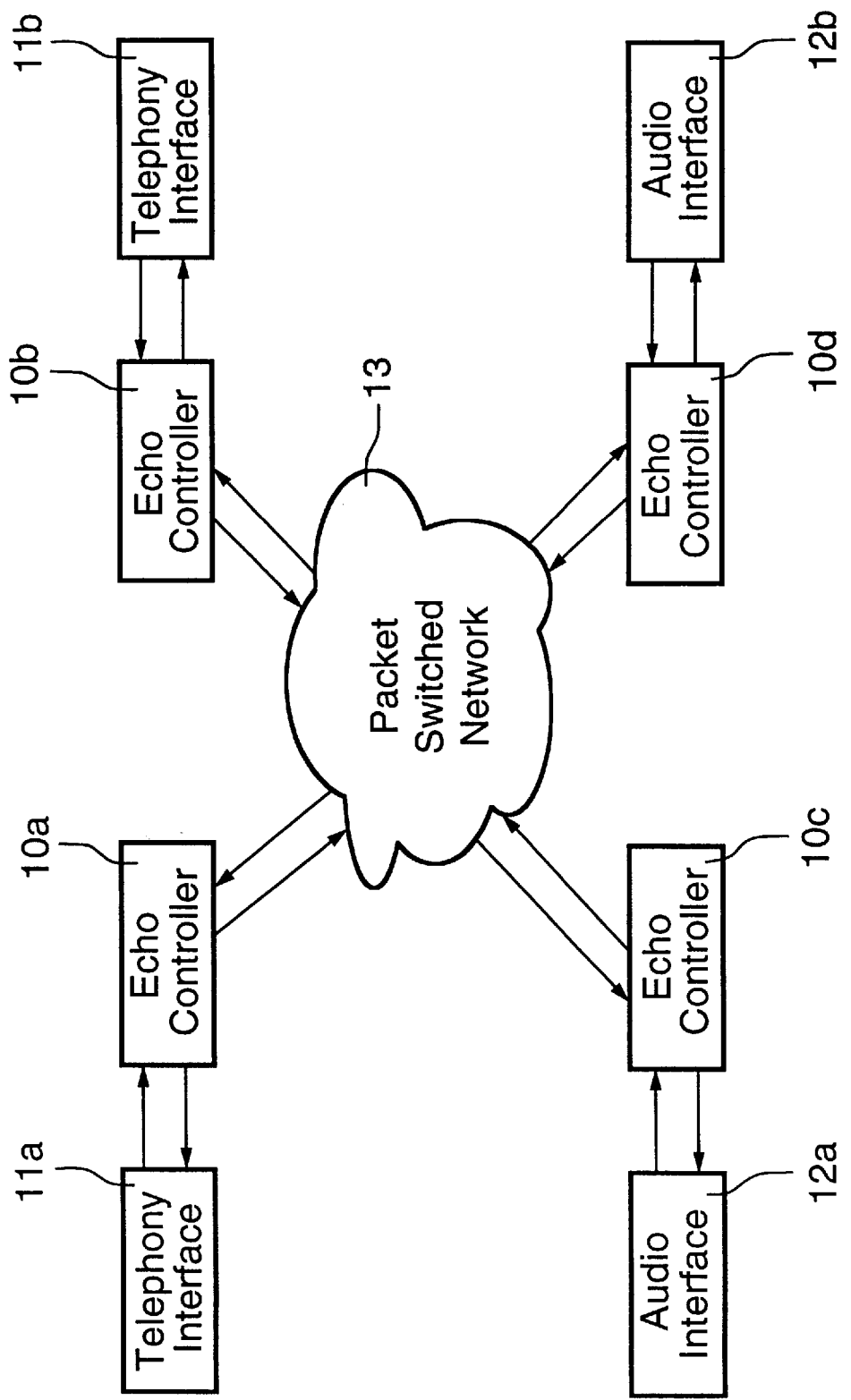
FIG. 1 represents a block diagram of a system incorporating the present invention.

With reference to FIG. 1, this shows echo controllers 10a–d placed between the sources of echo 11a–b, 12a–b and the packet switched network 13.

Figure 2:
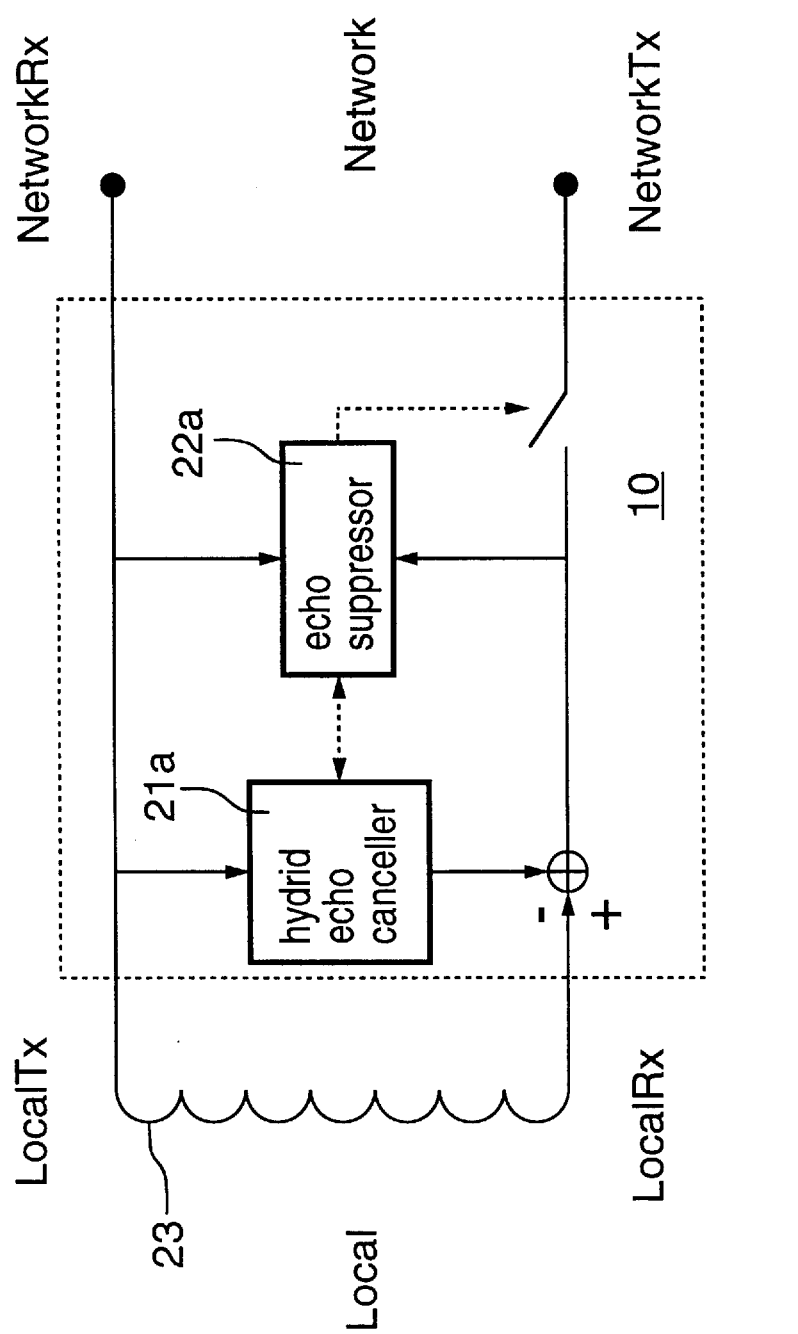
FIG. 2 represents a block diagram of an embodiment of the present invention, when applied to a telephone central office interface implementation.

FIG. 2 represents a block diagram of the implementation of an analog interface to the Public Switched Telephone Network (PSTN), wherein Echo Controller 10 is positioned at the 4-wire interface between the Packet Switched Network labelled Network and the analog telephony interface to the PSTN, labelled Local. In this particular application, the Local port is connected to an analog hybrid 23, which is the source of the unwanted echo signal.

Echo Controller 10 is composed of two major subsystems, namely, an Echo Canceller 21a and an Echo Suppressor 22a.

Figure 3:
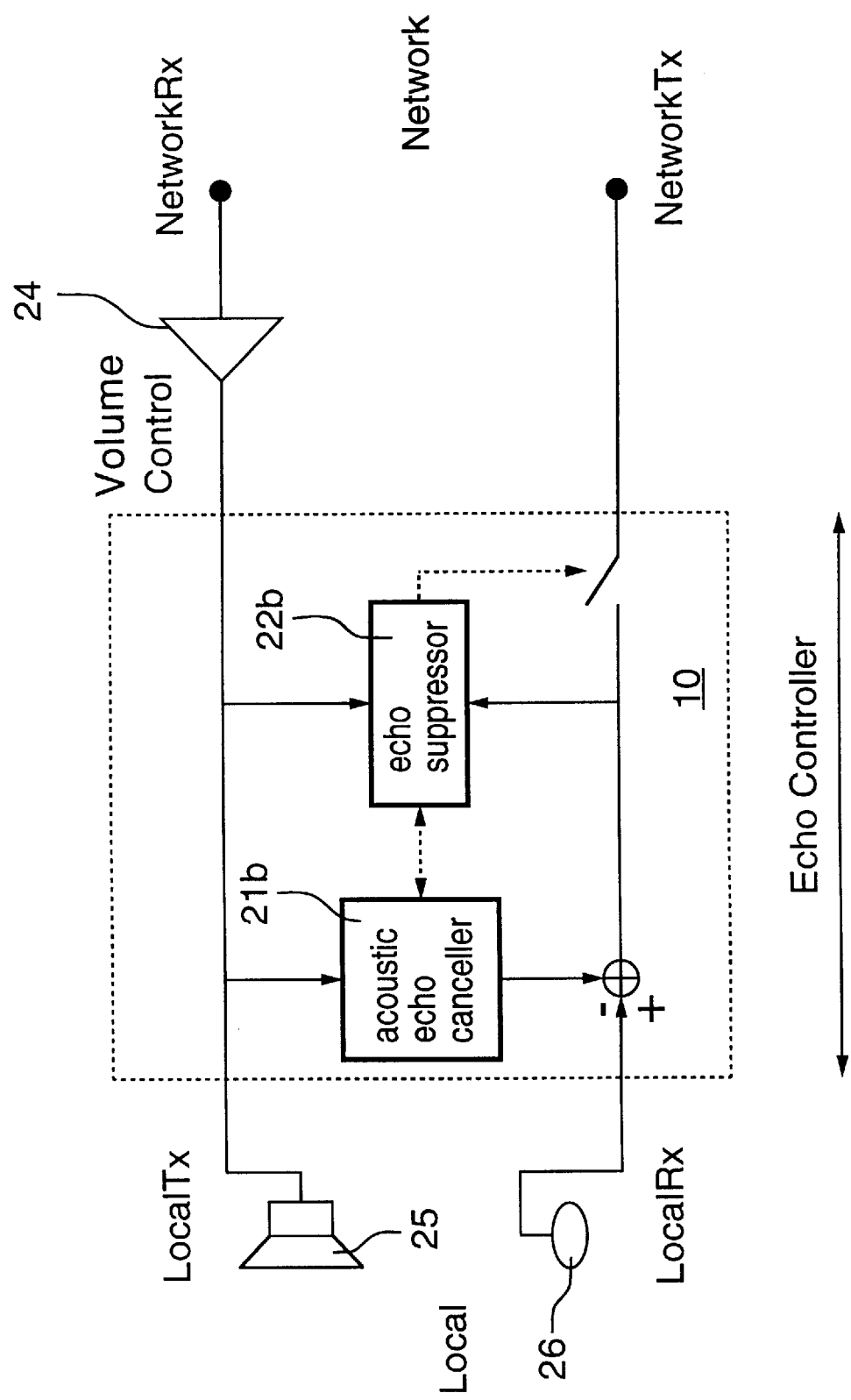
FIG. 3 represents a block diagram of an embodiment of the present invention, when applied to a full duplex telephone instrument implementation.

FIG. 3 represents a block diagram of a further embodiment of the present invention, within a full duplex speakerphone, wherein Echo Controller 10 is composed of two major subsystems, namely, Echo Canceller 21b and an Echo Suppressor 22b, and is positioned at the 4-wire interface between the Packet Switched Network labelled Network and analog transducers 25–26. In this embodiment, the unwanted echo signal is caused by acoustic reflection between speaker 25 and microphone 26. A volume control 24 is included in FIG. 3.

Figure 4:
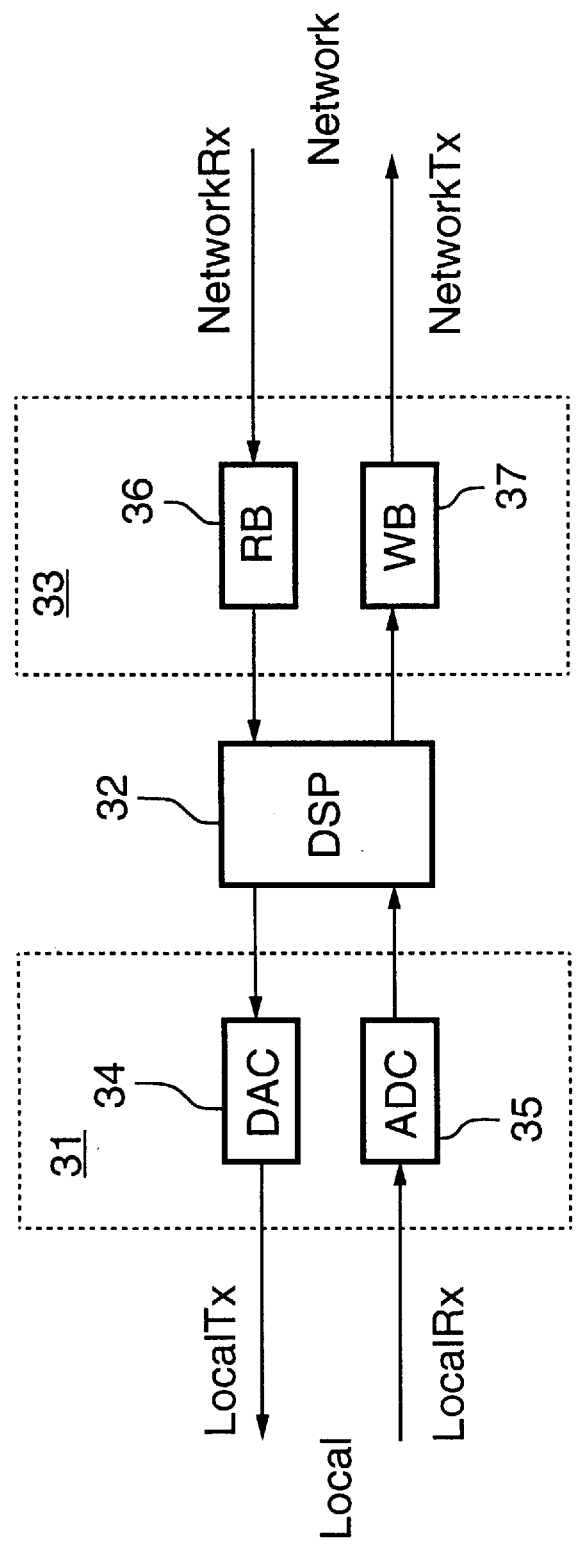
FIG. 4 represents the naming conventions used throughout the descriptions herein of the preferred embodiments.

FIG. 4 provides the rationale behind the naming conventions used throughout the descriptions of the preferred embodiments. It shows that the Echo Controller is equipped with two ports, labelled Local and Network. This embodiment of the Echo Controller is based upon a Digital Signal Processor (DSP) engine 32, which processes the signals flowing between the Local and Network ports. The Local port is equipped with a code 31, which possesses a Digital to Analog Converter (DAC) 34 and an Analog to Digital Converter (ADC) 35. The Network port is equipped with an input/output buffer 33, which possesses a read buffer 36 and a write buffer 37.

Signals are named from the point of view of the DSP. Thus, the signal which is received from the Local port via ADC 35, is named LocalRx, and the signal which is transmitted to the Local port via DAC 34 is named LocalTx. Signals occurring at the Network port are similarly named NetworkRx and NetworkTx. Note that if the DSP performs a null operation, then LocalTx=NetworkRx and NetworkTx=LocalRx.

Figure 5:
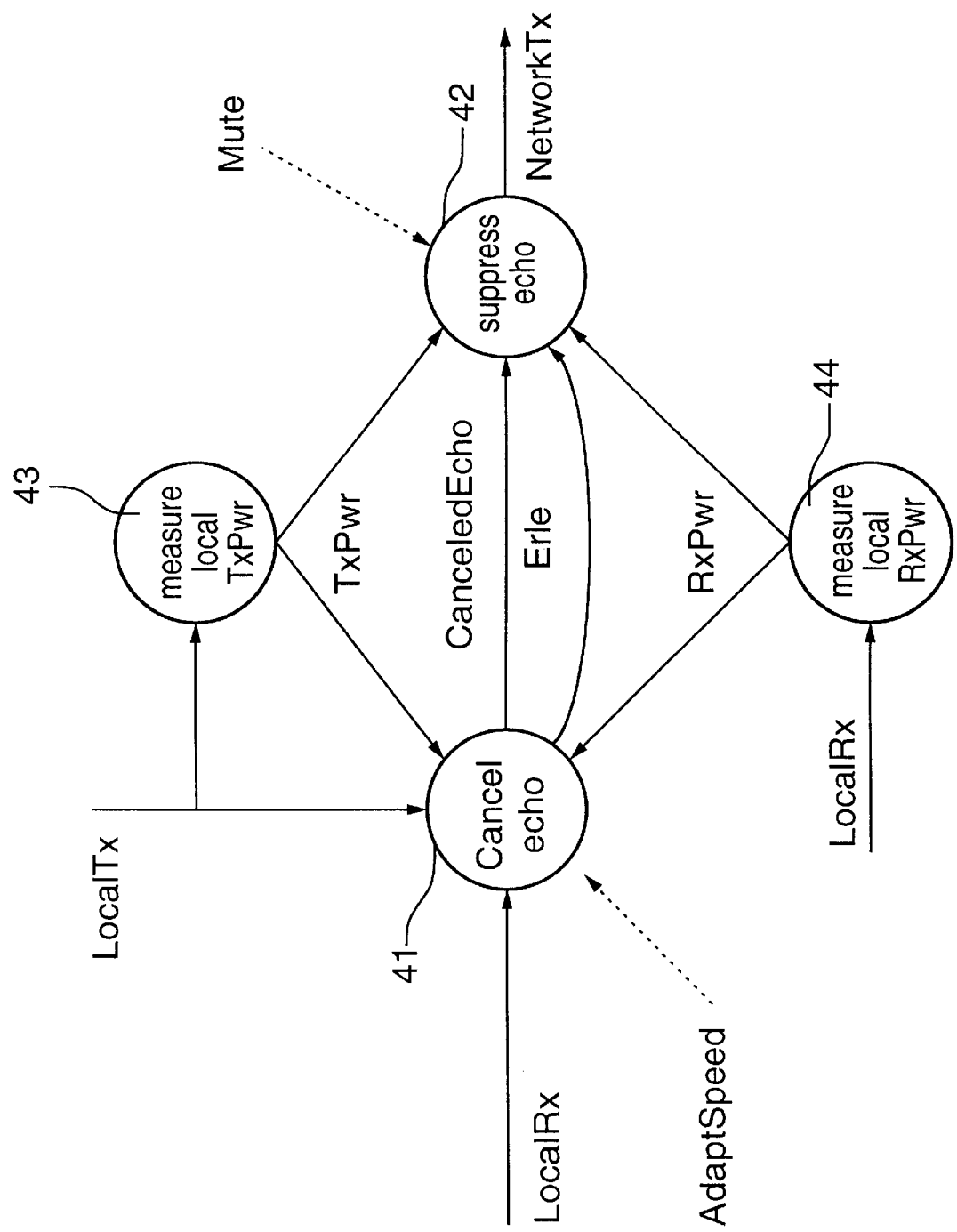
FIG. 5 represents a high level data flow diagram of a preferred embodiment of an echo controller according to the invention.

FIG. 5 provides a high level data flow diagram of a preferred embodiment of the Echo Controller, which consists of two main components, namely, a 'Cancel Echo' subsystem 41, and a 'Suppress Echo' subsystem 42. Cancel Echo 41 uses an adaptive filter to partially remove echoes from signal LocalRx whilst maintaining a bi-directional speech path. The resultant signal CanceledEcho is fed to the 'Suppress Echo' subsystem 42 which further attenuates the residual echo by switching in attenuation when it detects an echo condition. The resultant echo canceled and echo suppressed signal is fed to the Network port as NetworkTx.

The level of attenuation is reduced as the performance of 'Cancel Echo' increases. In this way, if 'Cancel Echo' is performing well there is no attenuation switched in and the echo controller maintains a full duplex speech path. However, if 'Cancel Echo' is unable to remove the echo, then more attenuation is switched in and the link degrades to half duplex operation. In this way, the echo controller's performance degrades in a progressive rather than a catastrophic manner. Subsystems 43 and 44 measure the power levels of the LocalTx and LocalRx signals, respectively. These power measurements are used to modify the performance of the echo canceller and echo suppresser subsystems, as described, hereinbelow.

Figure 6:
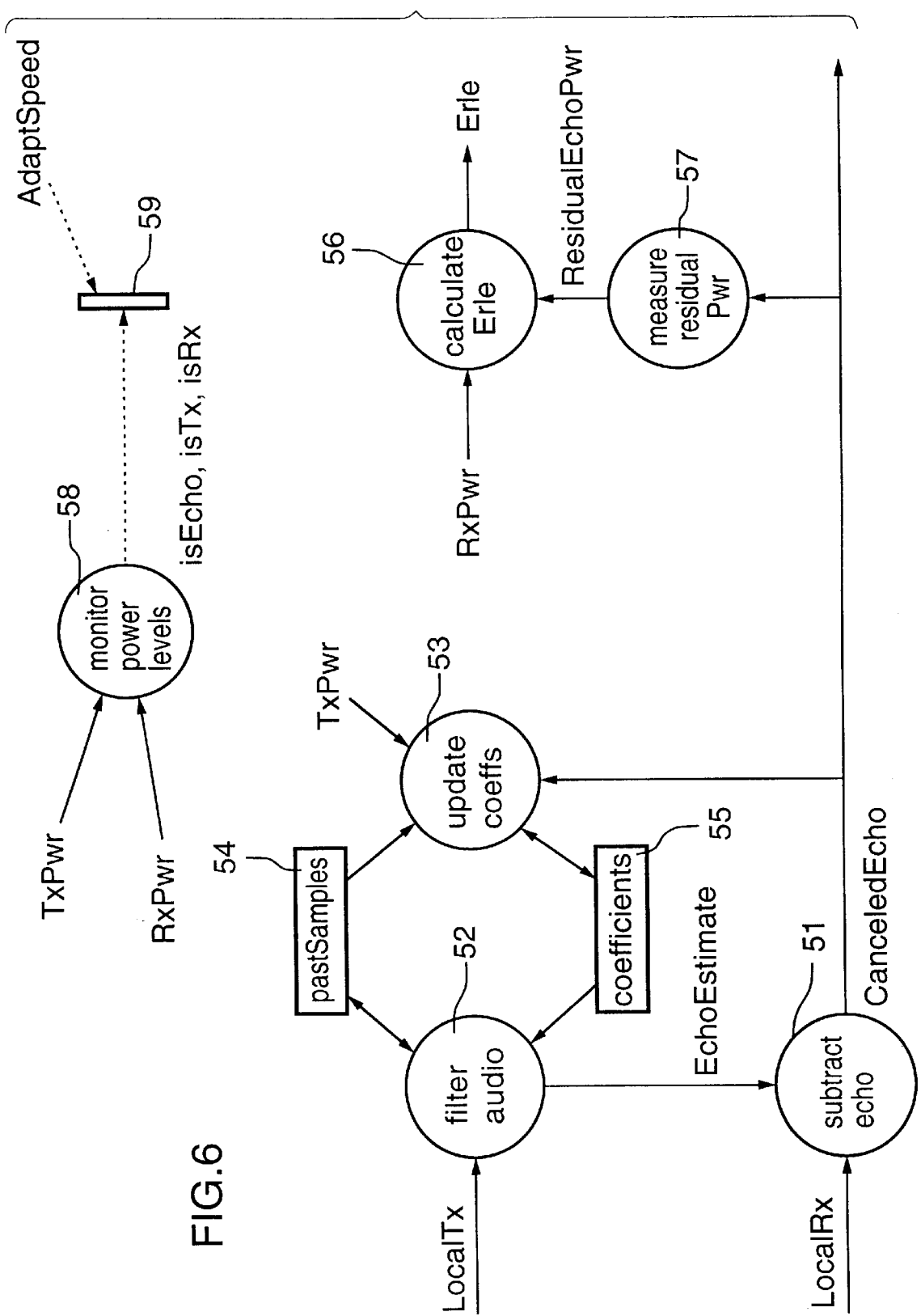
FIG. 6 represents a data flow diagram of the echo canceller section of an echo controller according to the invention.

FIG. 6 provides a detailed data flow diagram of a preferred embodiment of the Echo Canceller subsystem according to the invention wherein its operation is described hereinbelow.

The Cancel Echo subsystem removes echoes from the LocalRx signal. The major components include an adaptive filter, a talk status monitor and a performance measurement subsystem.

The signal LocalRx received from the local port is applied to 'Subtract Echo' node 51, which subtracts signal EchoEstimate—the estimated value of the corresponding echo signal, to produce signal CanceledEcho—the improved or echo-canceled version of LocalRx. Signal CanceledEcho is delivered to 'Suppress Echo' subsystem 42, as well as being used internally to monitor and tune the operation of the subsystem. Signal CanceledEcho is applied to 'Update Coeffs' node 53 in order to optimize the filter coefficients being used to generate the EchoEstimate signal. To perform this function, node 53 is also provided with signal TxPwr—the power value of the LocalTx signal, the current values of filter coefficients 55 and the values of previous LocalTx samples. Signal EchoEstimate is generated by 'FilterAudio' node 52, which models the impulse response of the hybrid attached to the local port and applies the model to signal LocalTx. Signal CanceledEcho is applied to 'Measure Residual Pwr' node 57 in order to derive signal ResidualEchoPwr—the power value of the echo signal still remaining. This value is compared with signal RxPwr—the power value of the original signal received from the local port, to derive signal Erle—the value of the Echo Return Loss Enhancement (ERLE) being achieved by the 'Cancel Echo' subsystem. The derivation of signal Erle is performed by 'Calculate Erle' node 56. The updating of filter coefficients and calculation of ERLE can only be performed at periods during which signal LocalRx is deemed to be a true reflection (echo) of signal LocalTx. This condition is identified by control program node 59 using power values of the signals provided by 'Monitor Power Levels' node 58.

Figure 7:
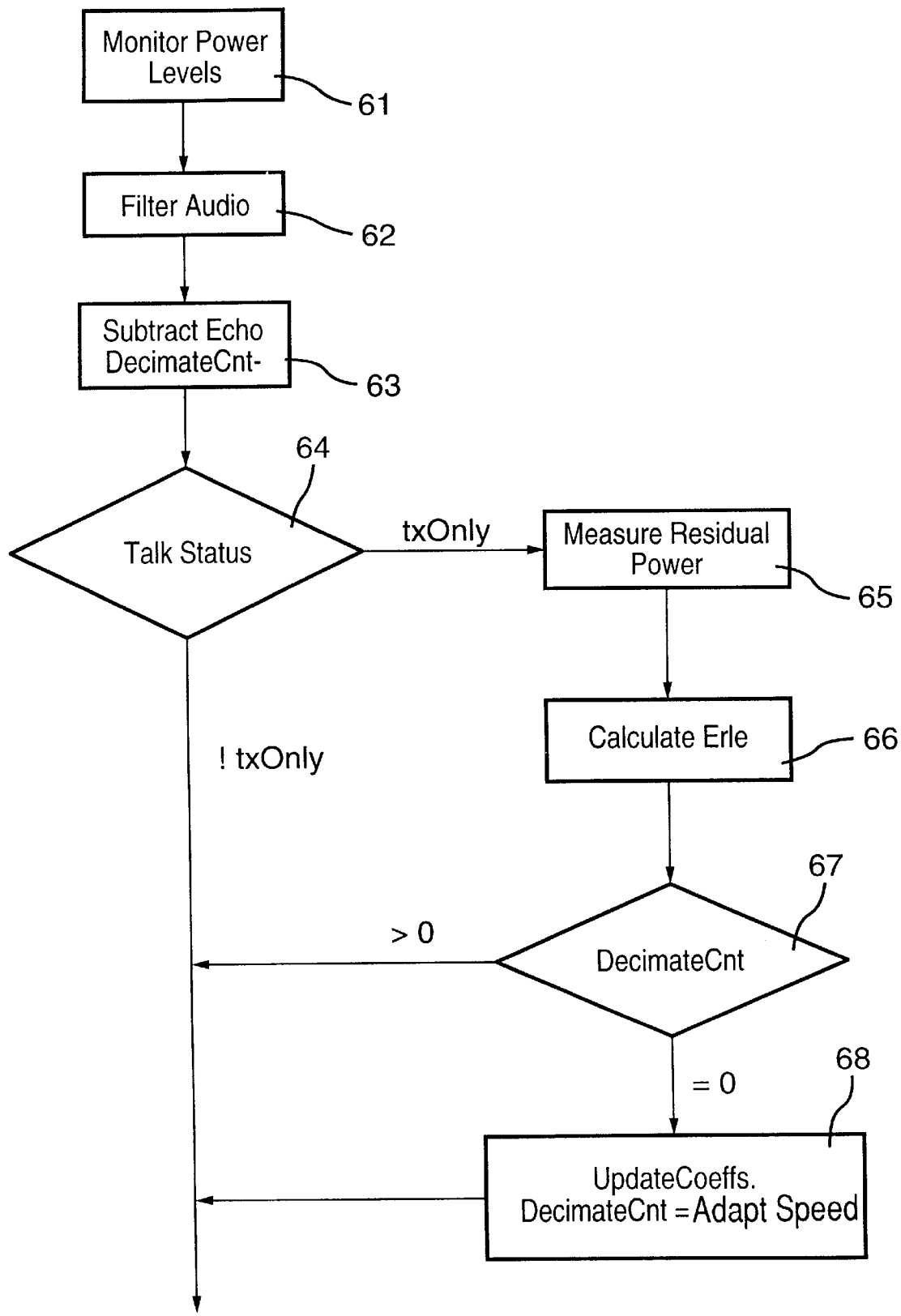
FIG. 7 represents a flow chart illustrating the sequence of actions required to implement an echo canceller subsystem according to the invention.

FIG. 7 provides a flow chart illustrating the sequence of actions required to implement the 'Cancel Echo' function described in FIG. 6. Its operation is described hereinbelow.

Module 61—Monitor Power Levels—provides the implementation of node 58. The module takes as input signals TxPwr & RxPwr and derives output signals isTx, isRx & isEcho. Signal isTx is true if TxPwr is greater than predefined parameter TxSilence. Signal isRx is true if RxPwr is greater than predefined parameter RxSilence. Signal isEcho is true if the value of RxPwr is less than or equal to the product of the hybrid reflection coefficient and TxPwr. Note that the assertion isEcho is based upon power measurements only. The assertion is modified by further parameters before being used to control operation of the subsystem.

Module 62—Filter Audio—provides the implementation of node 52 and takes as input signal LocalTx and derives output signal EchoEstimate. Signal EchoEstimate is derived by applying the assumed impulse response of the circuit attached to the local port—as characterized by coefficients 55—to the previous samples 54 of signal LocalTx.

Module 63—Subtract Echo—provides the implementation of node 51 and module performs a linear subtraction of signal EchoEstimate from signal LocalRx. Within this module, counter 'DecimateCnt' is decremented. The counter controls the frequency with which the filter coefficients are updated.

Module 64—Talk Status—interprets the information provided by node 61 and takes as input signals isTx, isRx & isEcho and produces as output signal txOnly. Its operation is summarized in Table 1 below.

TABLE 1

| Input | | | Output | |
|---|---|---|---|---|
| isTx | isRx | isEcho | talkStatus | Comments |
| 0 | 0 | 0 | idle | no one talking |
| 0 | 0 | 1 | idle | small network tx signal, small received echo signal |
| 0 | 1 | 1 | idle | network stopped talking, delayed echo |

TABLE 1-continued

| Input | | | Output | |
|---|---|---|---|---|
| isTx | isRx | isEcho | talkStatus | Comments |
| | | | | received |
| 1 | 0 | 0 | txOnly | unlikely state - implied no reflection |
| 1 | 0 | 1 | txOnly | network talking, very small echo signal returning |
| 1 | 1 | 1 | txOnly | network talking, echo returning |
| 0 | 1 | 0 | rxOnly | local talking only |
| 1 | 1 | 0 | double | network talking and local talking |

If signal txOnly is false then processing is complete, otherwise processing continues with module 65. By this means, tuning of the echo canceller is performed only when it is deemed that signal LocalRx is a reflection of signal LocalTx, uncorrupted by extraneous signals.

Module 65—Measure Residual Power—provides the implementation of node 57 and takes as input signal CanceledEcho and calculates the power content of the signal over a predefined period. In this particular embodiment, the predefined period is taken to be the duration of a complete packet of information (48 samples) as defined by the attached packet switched network. It will be apparent to those skilled in the art that this value is not unique and that other values are possible.

Module 66—Calculate Erle—provides the implementation of node 56 and takes as input signals RxPwr & ResidualEchoPwr and produces as output signal Erle. The signal is derived by dividing the value of signal RxPwr by the value of signal ResidualEchoPwr.

Module 67—DecimateCnt—tests the value of the counter, which has previously been decremented by module 63. If its value is greater than zero, then processing terminates, otherwise processing continues with module 68.

Module 68—Update Coeffs—provides the implementation of node 53 and takes as input signals TxPwr & CanceledEcho and updates coefficients 55 to minimize the power content of signal CanceledEcho. When the update is complete, counter 'DecimateCnt' is reset to the value determined by preset constant 'AdaptSpeed'.

Figure 8:
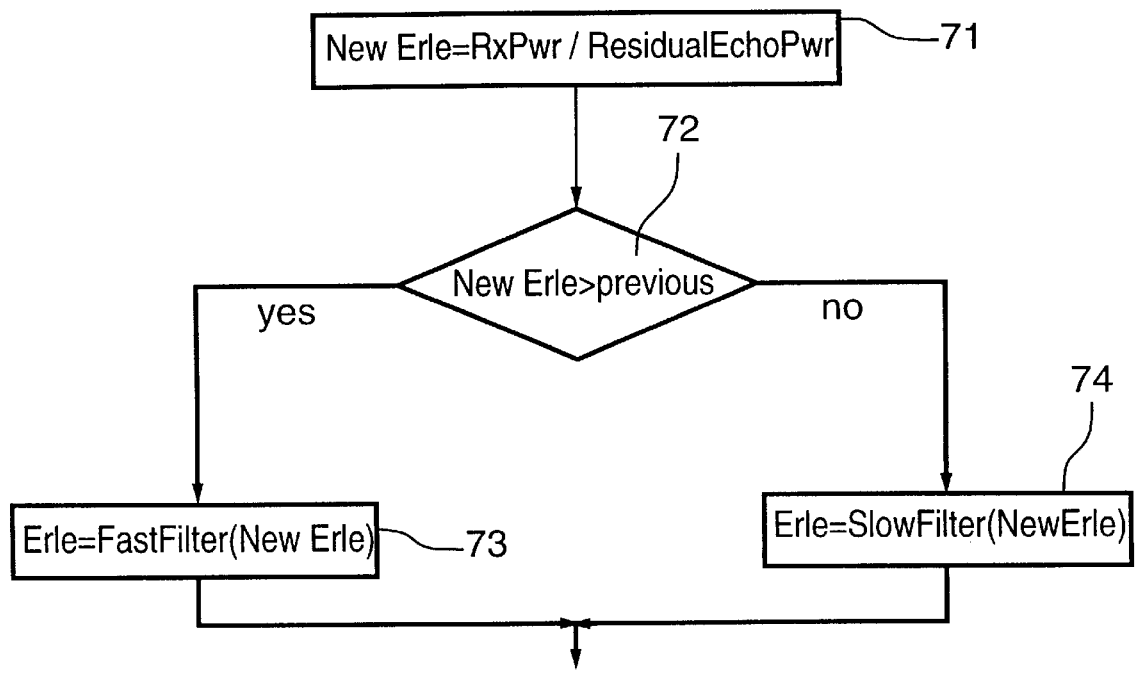
FIG. 8 represents a flow chart illustrating the sequence of actions required to implement the echo return loss enhancement calculation of the echo canceller subsystem according to the invention.

FIG. 8 provides a flow chart illustrating the sequence of actions required to implement the 'Calculate Erle' module 66 described in FIG. 7. Its operation is described hereinbelow.

Module 71 calculates a new value for Erle as described previously. This value is compared in module 72 with the previous value of Erle. If the new value is greater than the previous value, then processing continues with module 73 where the value of signal Erle is allowed to approach the new value with a fast attack time. If the new value of Erle is less than the previous value, then processing continues with module 74 where the value of signal Erle is allowed to approach the new value with a slow decay time.

Figure 9:
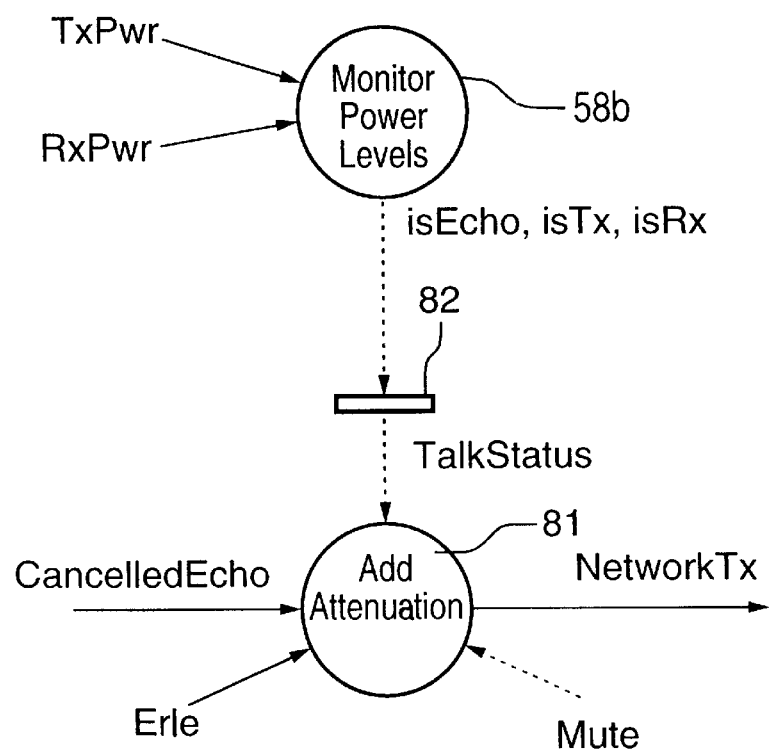
FIG. 9 represents a data flow diagram of a preferred embodiment of an echo suppresser subsystem according to the invention.

FIG. 9 provides a detailed data flow diagram of a preferred embodiment of the Echo Suppresser subsystem 42 according to the invention. Its operation is described hereinbelow.

During idle and when LocalTx is active, the echo suppresser maintains an attenuation between the CanceledEcho and NetworkTx signal paths. The amount of attenuation is dependent on echo canceller performance (ERLE). This attenuation is removed whenever double-talk occurs or LocalRx is active by itself. To prevent rapid switching of attenuation, a hangover period is used. When the attenuation switch is changed from closed to open during the transition from receive to idle state, the attenuation is gradually increased over a period of a few seconds for a smooth transition.

Nodes 58b performs a function identical to that performed by module 58 described previously.

Signal CanceledEcho is applied to the 'Add Attenuation' node 81, which generates an attenuated version of the signal as signal NetworkTx. The value of attenuation chosen is dependent on the other input data signal Erle and on control signals TalkStatus & Mute. The selection of attenuation value is described in the following figures.

Node 82 provides the control processing necessary for operation of the entire subsystem.

Figure 10A:
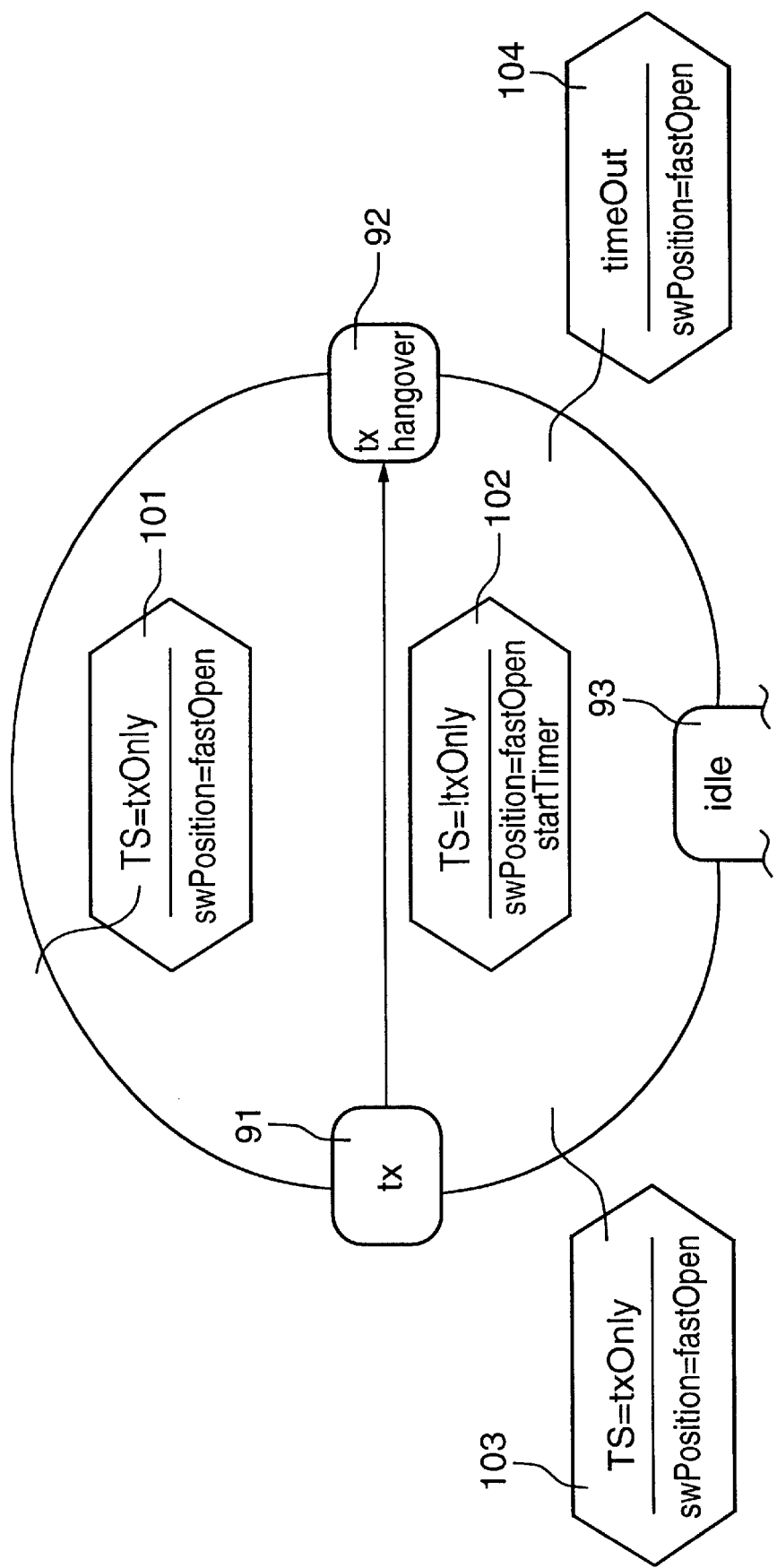
FIGS. 10A and 10B represents a state transition diagram describing the operation of an echo suppressser subsystem according to the invention.
Figure 10B:
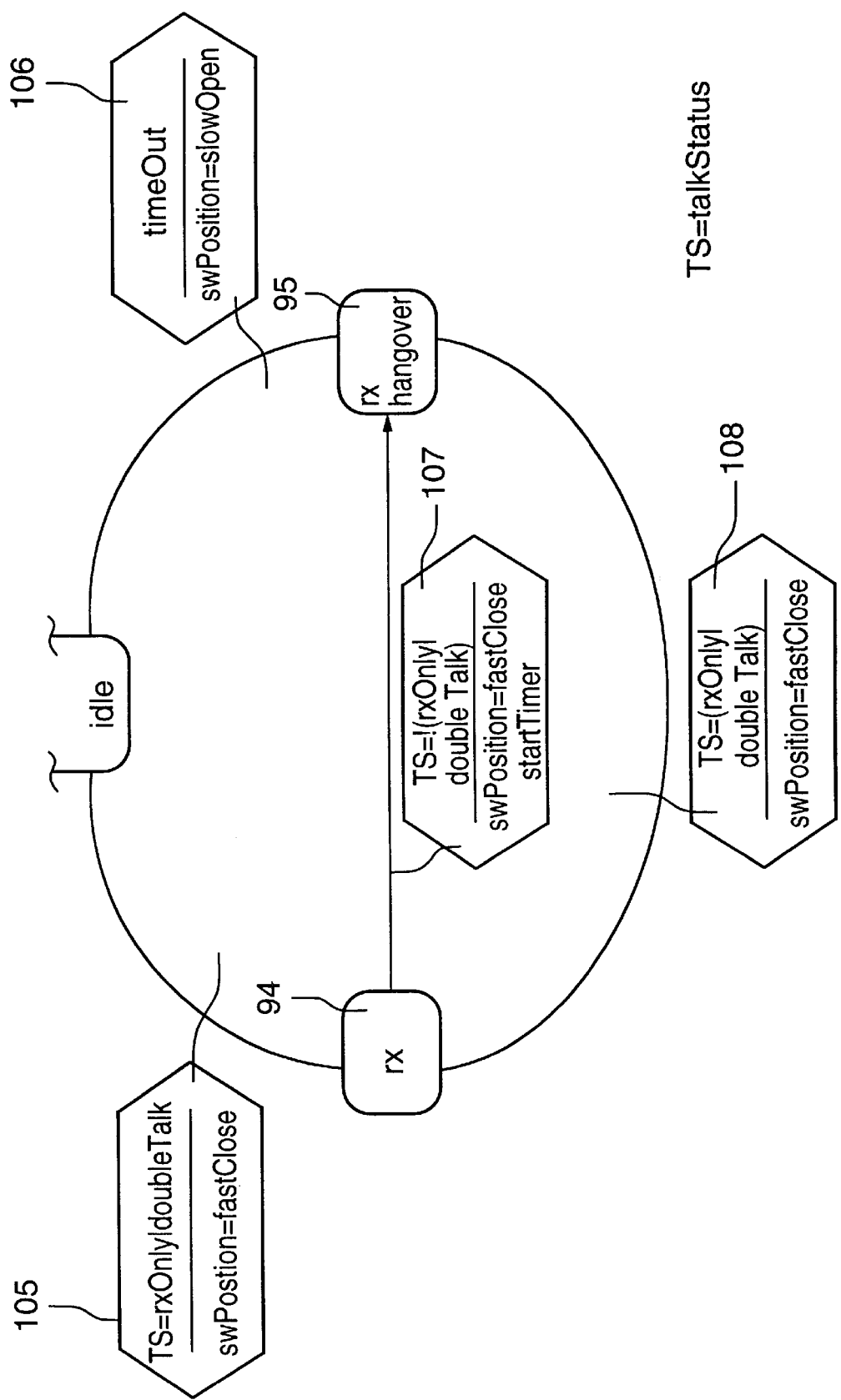

FIGS. 10A and 10B provides a state transition diagram describing the operation of the echo suppressser subsystem according to the invention. The subsystem contains five states 91–95 and supports eight transitions 101–108 between the states.

It is assumed that the subsystem initializes to the idle state 93. In this state, the echo suppresser inserts attenuation between the CanceledEcho and NetworkTx signal paths. This is signified by setting the attenation switch (swPosition) to 'Open'. If control TalkStatus changes value to 'txOnly', then the subsystem moves to the tx state 91 via transition 103 and 'swPosition' remains 'Open'. In this condition, if TalkStatus changes value to anything other than 'txOnly', then the subsystem moves to the tx hangover state 92 via transition 102 and 'swPosition' remains 'Open'. A timer is started which, if it expires, causes a return to the idle state via transition 104. If however 'txOnly' is reasserted then the subsystem returns to the tx state via transition 101.

In the idle state, if the value of TalkStatus is determined to be 'rxOnly' or 'DoubleTalk', the subsystem moves to the rx state 94 via transition 105. The value of 'swPosition' is set to 'Closed', causing the attenuation to be removed from the NetworkTx signal path. If control TalkStatus changes to anything other than 'rxOnly' or 'DoubleTalk', the subsystem moves to the rx hangover state 95 via transition 107 and 'swPosition' remains 'Closed'. A timer is started which, if it expires, causes a return to the idle state via transition 106. If however 'rxOnly' or 'DoubleTalk' is reasserted then the subsystem returns to the rx state via transition 108.

During transition 106 to the idle state, attenuation of the signal path is gradually increased by setting the value of 'swPosition' to 'slowOpen'. This mechanism is described in FIG. 11.

Figure 11:
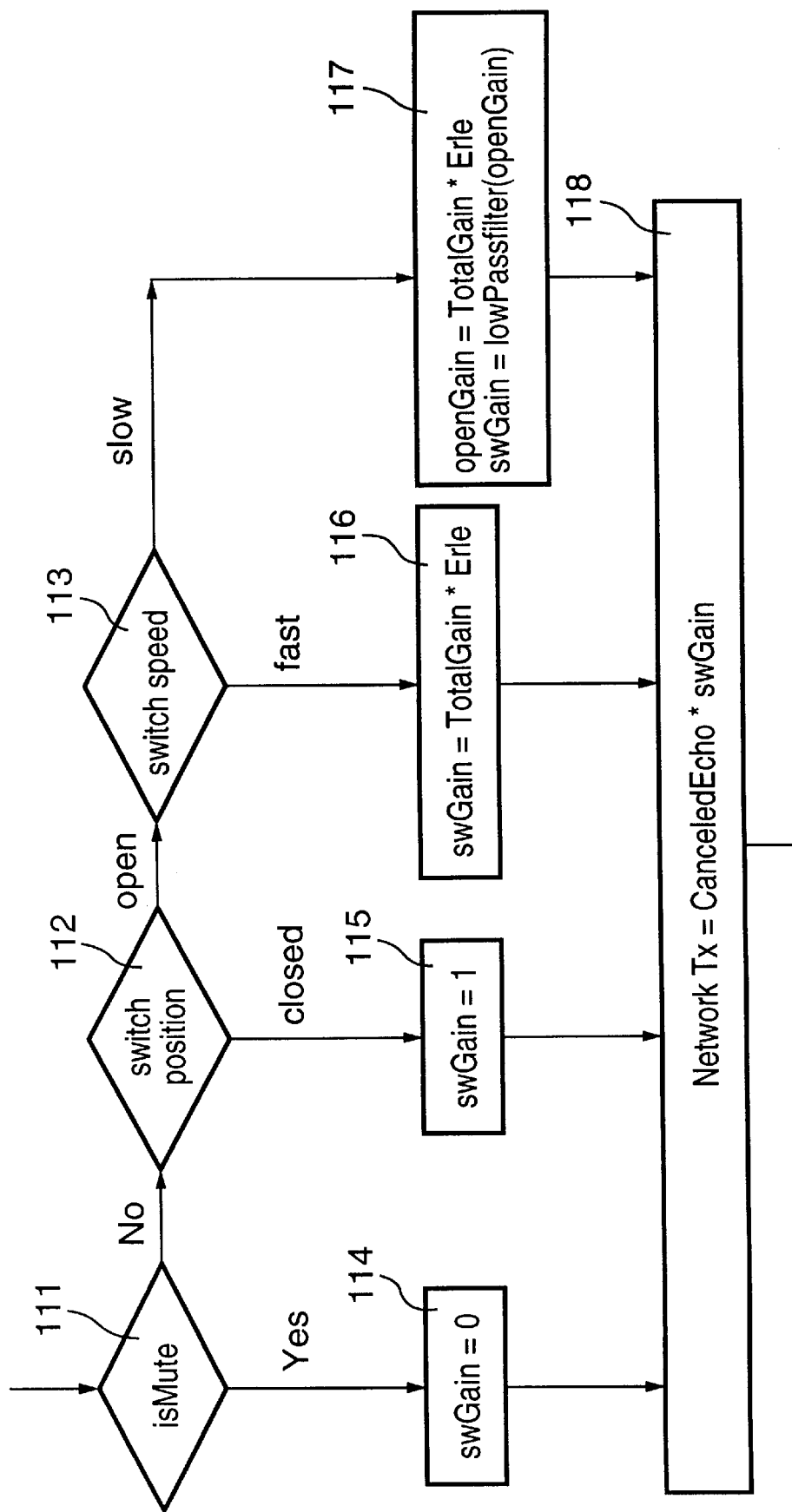
FIG. 11 represents a flow chart describing the logic required to select an attenuation value to be applied by an echo suppresser subsystem according to the invention.

FIG. 11 provides a flow chart describing the logic required to select an attenuation value to be applied by the echo suppresser subsystem.

FIG. 10 describes hereinabove the mechanism for setting the value of 'swPosition'. The algorithm described by FIG.

11 uses the value of control 'swPosition' as well as signals is Mute & Erle to determine the amount of attenuation to be inserted.

Processing commences with module 111, which tests whether it is desired to mute the signal being transmitted to the Network port. If this is so, then the value of control swGain is set to zero by module 114. If muting is not required then 'swPosition' is tested by module 112, which signifies that no attenuation is required, and then the value of control swGain is set to unity by module 115.

If the value of 'swPosition' is set to 'Open', then attenuation is required to be inserted, but a further test is required to determine the rate at which attenuation should be added. The test is performed by module 113. If attenuation must be added immediately, then the value of swGain is set to the product of Erle and predefined parameter TotalGain by module 116. If attenuation must be added slowly, then the product of Erle and TotalGain is passed through a low pass filter by module 117. The predefined parameter TotalGain is set at a value equal to the inverse of the desired echo return loss enhancement. In all cases, the value of signal NetworkTx is set to the product of CanceledEcho and swGain by module 118.

Figure 12:
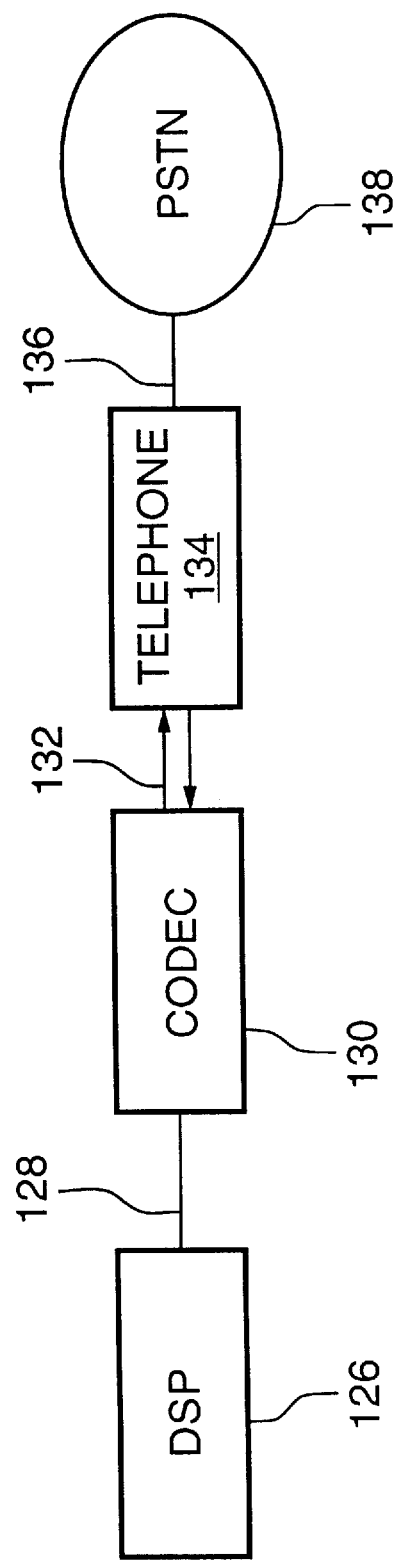
FIG. 12 represents a block diagram of an apparatus of an embodiment according to the invention.

FIG. 12 shows as 126, a Digital Signal Processor (Texas Instruments—C50 EVM card) connected by cable 128 (64 kb/s mu law—8 kHz sample rate synchronous serial connection) to a mu law Code 130 (Texas Instruments 3054), which, in time, is connected by a 4-wire cable 132 (transmit and ground, receive and ground) to a telephone 134, connected also on the tip and ring connections of 134 by the analog local loop telephone connection 136 to the Public Switched Telephone Network (PSTN) 138.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

I claim:

1. A method of controlling echo contained in audio signals transmitted between the nodes of a network wherein the audio signals experience delay in transit from node to node and wherein the echo controlling method is distributed across the nodes, said method comprising:

a) feeding a signal from a local source of audio information to the node;

b) canceling echo present in the local source signal to produce an echo canceled signal;

c) suppressing any residual echo present in the echo canceled signal to produce an echo suppressed signal;

d) delivering the echo suppressed signal to the network, wherein the echo cancellation of step (b) comprises e) feeding a signal from a network source of audio information to the node;

f) filtering the network source signal to provide an estimated echo signal; and g) subtracting the estimated echo signal from the local source signal of step (a) to produce the echo canceled signal of step (b);

wherein the filtering step (f) comprises:

h) feeding the network source signal to the filter node;

i) storing samples of the network source signal in a storage device at regular time intervals to provide a set of delayed samples;

j) multiplying the value of each delayed sample by a filter coefficient appropriate to the relative delay of each sample to provide a weighted sample; and k) adding together the value of each weighted sample to provide the estimated echo signal of step (f);

said method further comprising:

l) measuring the power contained in the local source signal of step (a) to provide a local power signal;

m) measuring the power contained in the network source signal of step (e) to provide a local power signal;

n) comparing the relative strength of the local power signal and the network power signal to provide an activity status signal;

o) feeding the activity status signal of step (n) to a filter coefficient adjustment function;

p) feeding the echo canceled signal of step (b) to the filter coefficient adjustment function;

q) feeding the network power signal of step (m) to the filter coefficient adjustment function;

r) feeding the set of delayed samples of step (i) to a Finite Impulse Response filter function;

s) modifying the coefficients of the filter function to provide an updated set of filter coefficients;

t) measuring the power contained in the echo canceled signal of step (b) to provide a residual echo power signal;

u) measuring the power contained in the local source signal of step (a) to provide a local power signal; and v) comparing the relative strengths of the residual echo power signal and the local power signal to produce an echo return loss enhancement signal and wherein the echo suppression of step (c) comprises:

w) measuring the power contained in the local source signal of step (a) to provide a local power signal;

x) measuring the power contained in the network source signal of step (e) to provide a network power signal;

y) comparing the relative strengths of the local power signal and the network power signal to provide an activity status signal;

z) feeding the activity status signal to a variable attenuation function;

aa) feeding the echo return loss enhancement signal device in step (v) to the variable attenuation function;

ab) feeding the echo canceled signal of step (b) to the variable attenuation function;

ac) modifying the gain of the variable attenuation function according to the relative level of the echo return loss enhancement signal and the condition of the activity status signal to provide a switched gain control; and ad) multiplying the echo canceled signal by the switched gain control to produce the echo suppressed signal.

2. A method as defined in claim 1 wherein the gain modification of step (ac) comprises:

ae) changing the state of an attenuation state machine according to the current value of the activity status signal and the current state of the attenuation state machine;

af) setting the value of a switch position control according to the current state of the attenuation state machine; and ag) modifying the value of the switched gain control according to the value of the switch position control and the value of the echo return loss enhancement signal.

3. Signal processing apparatus for controlling echo contained in audio signals transmitted between the nodes of a network wherein the audio signals experience delay in transit from node to node and wherein an echo controlling method is distributed across the nodes said apparatus comprising:
a) circuitry constructed and adapted to feed a signal from a local source of audio information to the node;
b) circuitry constructed and adapted to cancel echo present in the local source signal to produce an echo canceled signal;
c) circuitry constructed and adapted to suppress any residual echo present in the echo canceled signal to produce an echo suppressed signal; and
d) circuitry constructed and adapted to deliver the echo suppressed signal to the network; wherein the echo cancellation means (b) comprises:
  e) circuitry constructed and adapted to feed a signal from a network source of audio information to the node;
  f) circuitry constructed and adapted to filter the network source signal to provide an estimated echo signal; and
  g) circuitry constructed and adapted to subtract the estimated echo signal from the local source signal of circuitry (a) to produce the echo canceled signal; wherein the filtering circuitry (f) comprises:
    h) circuitry constructed and adapted to feed the network source signal to the filter node;
    i) circuitry constructed and adapted to store samples of the network source signal in a storage device at regular time intervals to provide a set of delayed samples:
    j) circuitry constructed and adapted to multiply the value of each delayed sample by a filter coefficient appropriate to the relative delay of each sample to provide a weighted sample; and
    k) circuitry constructed and adapted to add together the value of each weighted sample to provide the estimated echo signal; said apparatus further comprising:
      l) circuitry constructed and adapted to measure the power contained in the local source signal;
      m) circuitry constructed and adapted to measure the power contained in the network source signal; and
      n) circuitry constructed and adapted to compare the relative strengths of the local power signal and the network power signal to provide an activity status signal;
      o) means for feeding said activity status signal to a filter coefficient adjustment function;
      p) circuitry constructed and adapted to feed the echo canceled signal to the filter coefficient adjustment function;
      q) circuitry constructed and adapted to feed the network power signal to the filter coefficient adjustment function;
      r) circuitry constructed and adapted to feed the set of delayed samples to a Finite Impulse Response (FIR) filter function,
      s) circuitry constructed and adapted to modify the coefficients of the FIR filter function to provide an updated set of filter coefficients; and
      t) circuitry constructed and adapted to measure the power contained in the echo canceled signal;
      u) circuitry constructed and adapted to measure the power contained in the local source signal; and
      v) circuitry constructed and adapted to compare the relative strengths of the residual echo power signal and the local power signal to produce an echo return loss enhancement signal wherein the echo suppression circuitry (c) comprises:
        w) circuitry constructed and adapted to measure the power contained in the local source signal;
        x) circuitry constructed and adapted to measure the power contained in the network source signal;
        y) circuitry constructed and adapted to compare the relative strengths of the local power signal and the network power signal to provide an activity status signal;
        z) circuitry constructed and adapted to feed the activity status signal to a variable attenuation function;
        aa) circuitry constructed and adapted to feed the echo return loss enhancement signal derived by circuitry (v) to the variable attenuation function;
        ab) circuitry constructed and adapted to feed the echo canceled signal to the variable attenuation function;
        ac) circuitry constructed and adapted to modify the gain of the variable attenuation function according to the relative level of the echo return loss enhancement signal and the condition of the activity status signal to provide a switched gain control; and
        ad) circuitry constructed and adapted to multiply the echo canceled signal by the switched gain control to produce the echo suppressed signal.

4. Signal processing apparatus as defined in claim 3 wherein the gain modification circuitry (ac) comprises:
  ae) circuitry constructed and adapted to change the state of an attenuation state machine according to the current value of the activity status signal and the current state of the attenuation state machine;
  af) circuitry constructed and adapted to set the value of a switch position control according to the current state of the attenuation state machine; and
  ag) circuitry constructed and adapted to modify the value of the switched gain control according to the value of the switch position control and the value of the echo return loss enhancement signal.

* * * * *